H. E. RIPHAN.
FIFTH WHEEL FOR VEHICLES.
APPLICATION FILED OCT. 21, 1912.
1,065,968.
Patented July 1, 1913.
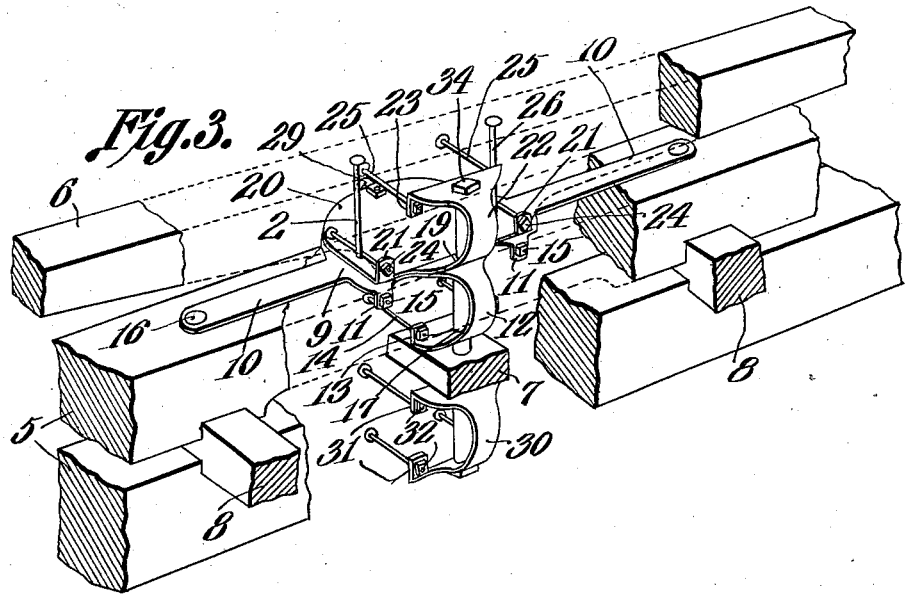
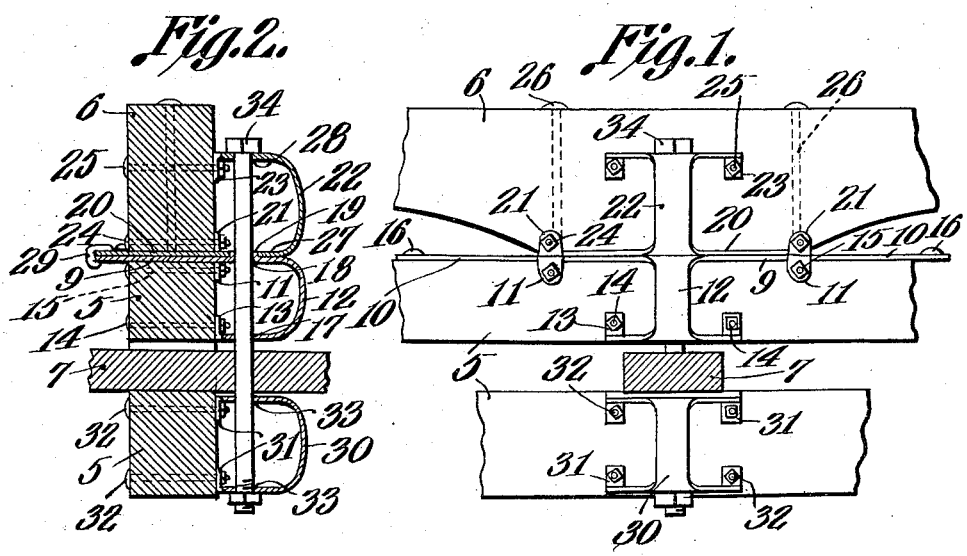
Henry E. Riphan,
Witnesses
Inventor
by C. A. Snow & Co.
Attorneys

UNITED STATES PATENT OFFICE.

HENRY E. RIPHAN, OF FENNIMORE, WISCONSIN, ASSIGNOR OF ONE-HALF TO CHRISTOPHER J. DAGENHART, OF BLUE MOUNDS, WISCONSIN.

FIFTH-WHEEL FOR VEHICLES.

1,065,968. Specification of Letters Patent. Patented July 1, 1913.

Application filed October 21, 1912. Serial No. 727,038.

*To all whom it may concern:*

Be it known that I, HENRY E. RIPHAN, a citizen of the United States, residing at Fennimore, in the county of Grant and State of Wisconsin, have invented a new and useful Fifth-Wheel for Vehicles, of which the following is a specification.

The present invention appertains to fifth wheels for vehicles, and aims to provide novel means for pivoting the front or steering axle to the head block or bolster in such a manner that the king bolt need not be passed through the axle or the head block, and is located at one side thereof.

The present invention also contemplates the provision of such a fifth wheel which shall be comparatively simple, substantial, durable, compact and inexpensive in construction, as well as efficient and convenient in its use.

To the above and other ends, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The preferred embodiment of the invention has been illustrated in the accompanying drawing, wherein—

Figure 1 is a front elevation of the fifth wheel; Fig. 2 is a vertical central section thereof; Fig. 3 is a perspective view of the fifth wheel, parts being broken away.

Referring specifically to the drawing, the axle has been designated by the numeral 5, which comprises a lower axle tree and a superimposed sand-board; the head block or bolster by the numeral 6; the reach by the numeral 7; and the hounds by the numeral 8, said parts being common in lumber wagons and other vehicles.

To all intents the sand-board and axle tree jointly provide the axle, and may be so considered in the present case, although in reality they probably could not be so considered.

In carrying out the present invention, a segmental plate 9 is secured to the top of the axle 5 or on the sand-board and projects forwardly therefrom. This segmental plate is provided with a pair of oppositely projecting straps 10 lying upon the sand-board and with a pair of ears 11 overlapping the rear face of the sand-board, a U-shaped clip 12 projecting from the rear edge of the segmental plate intermediate the ears 11 and having ears 13 projecting from its lower or free arm abutting against the rear face of the sand-board adjacent its lower edge of the section. Bolts 14 are passed through the ears 13 and the sand-board to secure the free arm of the clip to the same, and similar bolts 15 are passed through the ears 11 of the segmental plate and the sand-board, while bolts 16 are passed through the free ends of the straps 10 and the sand-board to assist the bolts 15 in securing the segmental plate to the sand-board. The bolts 16 are preferably passed through the hounds 8, in order to thus connect the segmental plate and the hounds and also secure the hounds between the sand-board and axle tree. The lower arm of the clip 12 is provided with an aperture or opening 17 and the upper arm thereof is provided with an opening or aperture 18 having its edges struck upwardly to form a boss 19.

A plate 20 is secured to the bottom of the bolster and complements the segmental plate 9, the said plate 20 having a pair of ears 21 at its rear edge overlapping the rear face of the bolster and having a U-shaped clip 22 projecting rearwardly therefrom intermediate the ears 21. The clip 22 has a pair of depending ears 23 at its upper or free end abutting against the rear face of the bolster. Bolts 24 are passed through the ears 21 and the bolster, and similar bolts 25 are passed through the ears 23 to secure the free arm of the clip 22 to the bolster, while bolts or rivets 26 are passed vertically through the bolster and are engaged to the plate 20 to assist in securing the plate to the bolster in connection with the bolts 24 passed through the ears 21. The lower and upper arms of the clip 22 are provided with the apertures 27 and 28, respectively, which are in alinement with the apertures of the clip 12, the boss 19 of the upper arm of the clip 12 being journaled within the aperture 27 of the lower arm of the clip 22 so as to pivot the two plates together. The upper plate 20 also has a hook 29 secured to the top thereof and at its forward edge, the said hook engaging the forward curved edge of the segmental plate 10 to retain the two plates in sliding contact.

A U-shaped clip 30 is also secured to the rear face of the axletree, the said clip having the ears 31 at its ends abutting against the axletree and being secured thereto by the bolts 32, the arms of the clip 30 being provided with the apertures 33 alining with the apertures of the aforementioned clips.

All the clips are of similar construction, their intermediate portions being comparatively narrow and their arms being relatively wide, or approximately triangular in form with their bases arranged adjacent the respective axle sections and bolster. The plates and clips may also be conveniently stamped or otherwise fashioned from sheet metal or other suitable material.

A king bolt 34 is passed through the aperture of the several clips in order to fulcrum the axle to the bolster, the king bolt being positioned in rear or to one side of the said parts, thereby eliminating the necessity of boring holes through the axle and bolster for the reception of the king bolt, as usual. The sand-board and axletree are also preferably spaced apart to receive the reach 7 therebetween and the reach is engaged to the king bolt. The boss 19 extends around the king bolt and enters the aperture in the lower arm of the bolster clip so as to retain the axle and bolster in pivotal relation, even though the king bolt is removed, and the said boss also prevents the wear of the king bolt between the axle and bolster clips.

The fifth wheel thus provided is an exceedingly serviceable one, and carries out the objects aimed at in a satisfactory manner, the advantages of the present device being apparent to those versed in the art.

Having thus described the invention, what is claimed as new is:

1. A fifth wheel for vehicles embodying an axle, a bolster, complementing segmental plates secured to the axle and bolster and projecting to one side thereof, the plates having U-shaped clips projecting to the other side with their free ends secured respectively to the axle and bolster, and a king bolt passing through the arms of the clips.

2. A fifth wheel for vehicles embodying an axle, a bolster, complementing segmental plates secured to the axle and bolster and projecting to one side, the plates having U-shaped clips projecting to the other side, with their free end secured respectively to the axle and bolster, a king bolt passing through the arms of the clips, a member carried by one segmental plate and slidably engaging the curved edge of the other, and one of the clips having a boss fitting around the king bolt and entering the arm of the other clip.

3. A fifth wheel for vehicles embodying a sand-board, an axle tree, a bolster, a reach fitting between the former parts, complementing segmental plates secured to the sand board and bolster and projecting one side, the plates having U-shaped clips projecting to the other side with their free ends secured respectively to the sand-board and bolster, a U-shaped clip terminally secured to the axle-tree, and a king bolt passing through the arms of all of the clips and through the reach.

In testimony that I claim the foregoing as my own, I have hereto affixed my signature in the presence of two witnesses.

HENRY E. RIPHAN.

Witnesses:
   JOHN J. SCANLAN,
   BRIDGET SCANLAN.